Sept. 9, 1930.  J. GOOSTRAY  1,775,521
BRAKE DRUM
Filed Oct. 24, 1929
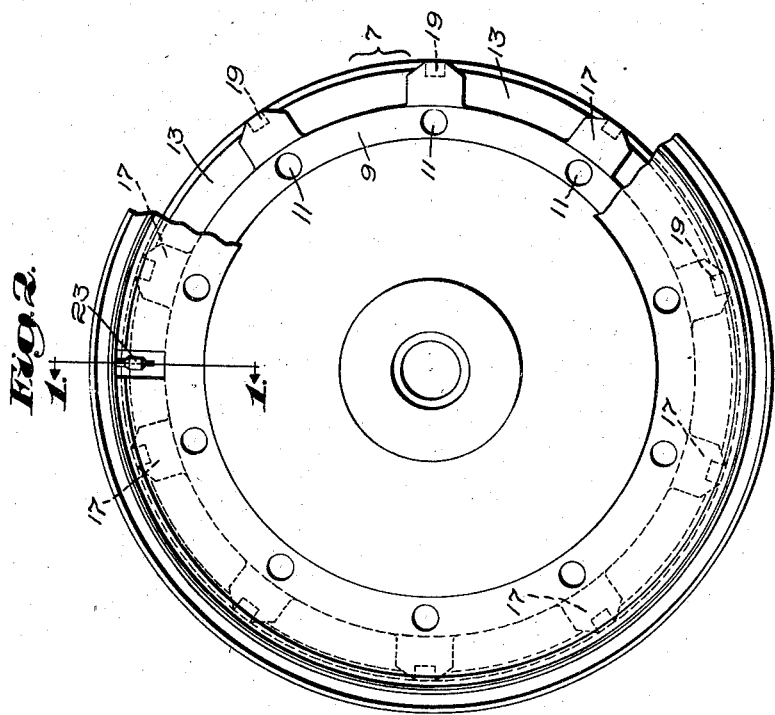
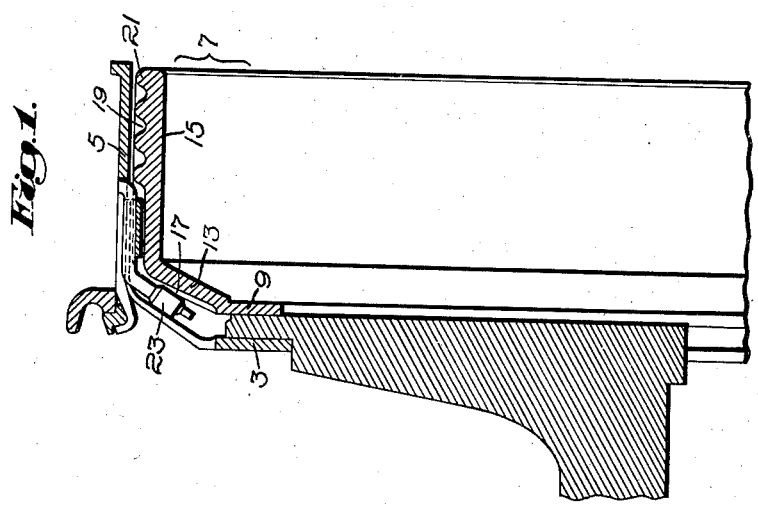
Inventor:
Joseph Goostray Patented Sept. 9, 1930

1,775,521

UNITED STATES PATENT OFFICE

JOSEPH GOOSTRAY, OF EAST MILTON, MASSACHUSETTS, ASSIGNOR TO HUNT-SPILLER MANUFACTURING CORPORATION, OF BOSTON, MASSACHUSETTS, A CORPORATION OF MASSACHUSETTS

BRAKE DRUM

Application filed October 24, 1929. Serial No. 402,044.

This invention relates to brake drums, particularly for use in connection with road vehicles such as busses or the like, and the object of the invention is to provide an improved construction for such drums which will be efficient, durable and quiet in operation.

The heavier demands due to the increase in size and power of busses and like vehicles have rendered the drums of cast or pressed steel commonly heretofore used inadequate. In accordance with my invention I utilize cast iron drums. Cast iron as a material for brake mechanisms is not new, its wearing properties being well recognized, but its use in connection with a road vehicle as a brake drum presents various problems answered by my present invention.

My invention will be well understood by reference to the following description of an illustrative embodiment thereof taken in connection with the accompanying drawings, wherein:—

Fig. 1 is a partial radial section through a disc wheel and its attached brake drum on the line 1—1 of Fig. 2; and Fig. 2 is an elevation on a smaller scale, partly broken away to disclose the drum in full lines.

In the drawings I have shown a disc wheel as commonly used on busses having the dished body 3 supporting in overhanging relation the tire-receiving rim 5. The brake drum 7 is closely fitted within the dish of the wheel. It is made of cast iron of suitable physical properties and is here shown as embodying a central annular portion 9 provided with bolt holes 11 for securing the drum in position, a conical portion 13 rising from the outer circumference of the annular portion 9 and adapted to the dish of the wheel, and a cylindrical portion 15 closely received within the rim 5 and presenting its interior surface for engagement with the brake band. The conical surface 13 may be provided on its outer side with radiating ribs 17 symmetrically arranged and conveniently, as shown, equal in number to the bolt holes 11 or to a simple multiple or sub-multiple thereof. Herein I have shown them as aligned therewith. The ribs 17 may be continued, conveniently with a reduction in width and increase in depth as shown, to provide transverse ribs 19 extending across the outer face of the cylindrical portion 15 where they may intersect and merge integrally with circumferential ribs 21.

The ribs 17 on the conical portion of the drum provide strength for this part without undue increase in weight or bulk and permit assembly of the drum with the wheel within the close limits of clearance permitted. For example, the valve stem 23 may be received in the space between two ribs 17, as best shown in Fig. 2. Due to the symmetrical arrangement of the ribs and bolt holes, the wheel or rim and the drum may be assembled without particular orientation with respect to the valve stem.

In actual use the drum as described is durable, resists heat cracking in use and prevents the objectionable squealing of brakes common with the drums previously used. Without binding myself to the exactitude of the explanation which follows, which is necessarily theoretical, I shall explain some considerations dictating the design of the drum as shown and which appear to be justified by the practical results. While the ribs as described strengthen the drum against distortion, their arrangement at the outer surface of the drum with the transverse parts 19 provides for better dissipation of heat and minimizes the tendency of the drum to turn within a relatively quiescent body of heated air. Thus the ribs not only increase the radiation of the surface but their disposition provides for convection. They also provide for equalization of the heat across the width of the drum due to temporarily uneven pressure on the brake bands. The arrangement prevents squealing since vibrations set up can travel but a short distance before encountering an area of different section and their propagation is thus checked.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. A cast metal brake drum for road vehicles and the like comprising a cylindrical portion offering at one side an engaging surface for the brake band, the other side being provided with intersecting ribs providing for the dissipation of heat and serving to check the propagation of vibrations set up in use.

2. A cast metal brake drum for road vehicles and the like comprising a cylindrical portion offering at one side an engaging surface for the brake band, the other side being provided with circumferential ribs and cross ribs integral with them serving to prevent the hugging of the drum by a relatively stationary layer of heated air and serving to check the propagation of vibrations set up in use.

3. A cast metal brake drum for use with disc wheels of road vehicles and the like comprising an annular attaching portion, a conical portion extending therefrom, a cylindrical portion extending from the latter and presenting interiorly a surface for engagement with a brake band, said conical portion having exterior radiating ribs extended out over the cylindrical portion.

4. A cast metal brake drum for use with disc wheels of road vehicles and the like comprising an annular attaching portion, a conical portion extending therefrom, a cylindrical portion extending from the latter and presenting interiorly a surface for engagement with a brake band, the exterior thereof being circumferentially ribbed, said conical portion having exterior radiating ribs extended out over the cylindrical portion and intersecting the circumferential ribs.

5. A cast metal brake drum for use with disc wheels of road vehicles and the like comprising an annular attaching portion, a conical portion extending therefrom and a cylindrical portion extending from the conical portion and presenting a brake band engaging surface, said conical portion having exterior radiating ribs.

6. A cast metal brake drum for use with disc wheels of road vehicles and the like comprising an annular attaching portion provided with bolt holes, a conical portion extending therefrom and a cylindrical portion extending from the conical portion and presenting a brake band engaging surface, said conical portion having exterior radiating ribs, said holes and ribs being similarly symmetrically arranged about the circumference of the drum.

7. A cast metal brake drum for use with disc wheels of road vehicles and the like comprising an annular attaching portion, a conical portion extending therefrom and a cylindrical portion extending from the conical portion and presenting a brake band engaging surface, said conical portion having exterior radiating ribs continued out across the exterior surface of the cylindrical portion.

In testimony whereof, I have signed my name to this specification.

JOSEPH GOOSTRAY.